(12) United States Patent
Shafiulla (10) Patent No.: US 12,149,508 B2
(45) Date of Patent: Nov. 19, 2024

(54) DATA SHARING BETWEEN TENANTS AT DIFFERENT NETWORK PLATFORMS

(71) Applicant: SAP SE, Walldorf (DE)

(72) Inventor: Mohammed Saifulla Shafiulla, Brisbane (AU)

(73) Assignee: SAP SE, Walldorf (DE)

(*) Notice: Subject to any disclaimer, the term of this patent is extended or adjusted under 35 U.S.C. 154(b) by 232 days.

(21) Appl. No.: 17/938,514

(22) Filed: Oct. 6, 2022

(65) Prior Publication Data
US 2024/0121221 A1  Apr. 11, 2024

(51) Int. Cl.
*H04L 9/40* (2022.01)
(52) U.S. Cl.
CPC ................ *H04L 63/0407* (2013.01)
(58) Field of Classification Search
CPC .................................................. H04L 63/0407
See application file for complete search history.

(56) References Cited

U.S. PATENT DOCUMENTS

| | | | |
|---|---|---|---|
| 8,095,618 B2 * | 1/2012 | Lewis | G06Q 30/02 709/213 |
| 9,032,406 B2 * | 5/2015 | Eberlein | G06F 11/3433 718/101 |
| 9,268,605 B2 * | 2/2016 | Wang | H04L 47/50 |
| 10,304,013 B2 | 5/2019 | Shaifulla et al. | |
| 10,348,858 B2 * | 7/2019 | Theebaprakasam | G06F 21/6218 |
| 10,904,074 B2 * | 1/2021 | Wilson | G06F 21/50 |
| 11,087,890 B2 | 8/2021 | Turrin et al. | |
| 2023/0319054 A1 * | 10/2023 | Hendrey | H04L 63/105 726/4 |

* cited by examiner

*Primary Examiner* — Han Yang
(74) *Attorney, Agent, or Firm* — Fish & Richardson P.C.

(57) ABSTRACT

Methods, systems, and computer-readable storage media for sharing of data between tenants associated with network applications. A set of queues related to a set of tenants at a plurality of platforms is maintained. Each queue stores a set of messages related to events generated by a particular tenant from the set of tenants. Each queue of is divided into a respective subset of sub-queues. Each sub-queue of the respective subset of sub-queues is associated with a particular topic. Access control permissions and network connections defined for each tenant of the set of tenants are evaluated. Data federation logic is executed to distribute data from a first sub-queue of a first queue associated with a first tenant of the set of tenants to at least one other sub-queue of a second queue associated with a second tenant based on at least one matching topic defined in the data federation logic.

20 Claims, 5 Drawing Sheets

210 — Maintain (e.g., at a host platform) a set of queues related to a set of tenants at a plurality of platforms, wherein each queue of the queues stores messages related to events generated by a respective tenant from the set of tenants

220 — Divide each queue of the set of queues to a respective subset of sub-queues, wherein each sub-queue of the respective subset of sub-queues is associated with a particular topic

230 — Evaluate access control permissions and network connections defined for each tenant of the set of tenants

240 — In response to the evaluation, execute data federation logic for distributing messages between the set of queues, wherein executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic

DATA SHARING BETWEEN TENANTS AT DIFFERENT NETWORK PLATFORMS

BACKGROUND

Software applications may execute processes to provide user-requested services. A cloud platform landscape includes different software applications and services that can be distributed across multiple nodes, tenants, physical machines, or technology platforms. Customers consume services provided by a composition of a variety of cloud applications or services. For example, applications running in different virtual environments may rely on data stored in other applications in other virtual environments. Oftentimes one application from one cloud provider utilizes services from another application provided by a different cloud provider.

SUMMARY

Implementations of the present disclosure are directed to data sharing between network platforms.

In some implementations, actions include that a set of queues related to a set of tenants at a plurality of platforms are maintained, wherein each queue in the set of queues stores a set of messages related to events generated by a particular tenant from the set of tenants. Each queue of the set of queues is divided into a respective subset of sub-queues, wherein each sub-queue of the respective subset of sub-queues is associated with a particular topic. Access control permissions and network connections defined for each tenant of the set of tenants are evaluated, and, in response to the evaluation, data federation logic for distributing messages between the set of queues is executed. Executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

These and other implementations can each optionally include one or more of the following features, including obtaining messages at the set of queues based on subscriptions defined for applications associated with particular tenants, wherein the subscriptions are defined at consumer applications running on a host platform, and wherein the set of queues are maintained on the host platform.

In some implementations, the method is executed at a host platform. The applications can be hosted on a plurality of platforms including the host platform and an external cloud platform.

In some implementations, events generated by the first tenant are associated with executed data operations at a first cloud application for data objects stored at a database of the first cloud application.

In some implementations, the method can optionally include instantiating an event collection application to consume data related to events executed at a set of applications, wherein each application runs at a respective platform from the plurality of platforms and is associated with a tenant from the set of tenants.

In some implementations, the executing of the data federation logic includes determining permissions for sharing data between tenants based on the access control permissions defined for the set of tenants at the plurality of platforms and the network connections defined between pairs of platforms from the plurality of platform, wherein the execution of the data federation logic includes copying messages from the first sub-queue defined for the first tenant to the second sub-queue defined for the second tenant based on determining access permissions for sharing messages between the first queue of the first tenant and the second queue of the second tenant in association with the matching topics of the first sub-queue and the second sub-queue.

In some implementations, the data federation logic is dynamically executed based on data consumption rules defined per tenant.

In some implementations, the method includes that after executing the data federation logic, data is automatically provided to a customer-specific application of the first tenant from on changes in the data at sub-queues of the first tenant, wherein the customer-specific application is running at the host platform as a cloud application services providing services for consumption by the first tenant.

Other implementations of this aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to sharing data between tenants associated with running network applications at one or more platforms. More particularly, implementations of the present disclosure are directed sharing data between connected parties associated with the execution of process flows that consume data from one another and provide data that can be further consumed by other parties in accordance with implementations of the present disclosure.

In some instances, a business network (e.g., a business supply chain network) can support visibility and agility for execution of end-to-end processes by sharing data between supply chain parties in a faster and more efficient manner. In those instances, planning, forecasting, predictability, and quality of provided services can be improved by the efficient sharing of data between network parties.

In some instances, a business network can be defined on one or multiple connected cloud platforms where network applications are executed (e.g., as software-as-a-service (SaaS) solutions), and can be consumed by different parties (e.g., customers, producers, manufacturers, suppliers, buyers, carriers, shipment companies, or operators, among other example organizations or companies providing business, procurement, logistics, or other services) to perform supply chain processes. Connecting data streams across parties in a business network is a key challenge to achieving resiliency and to streamline process execution at different network ends.

Figure 1:
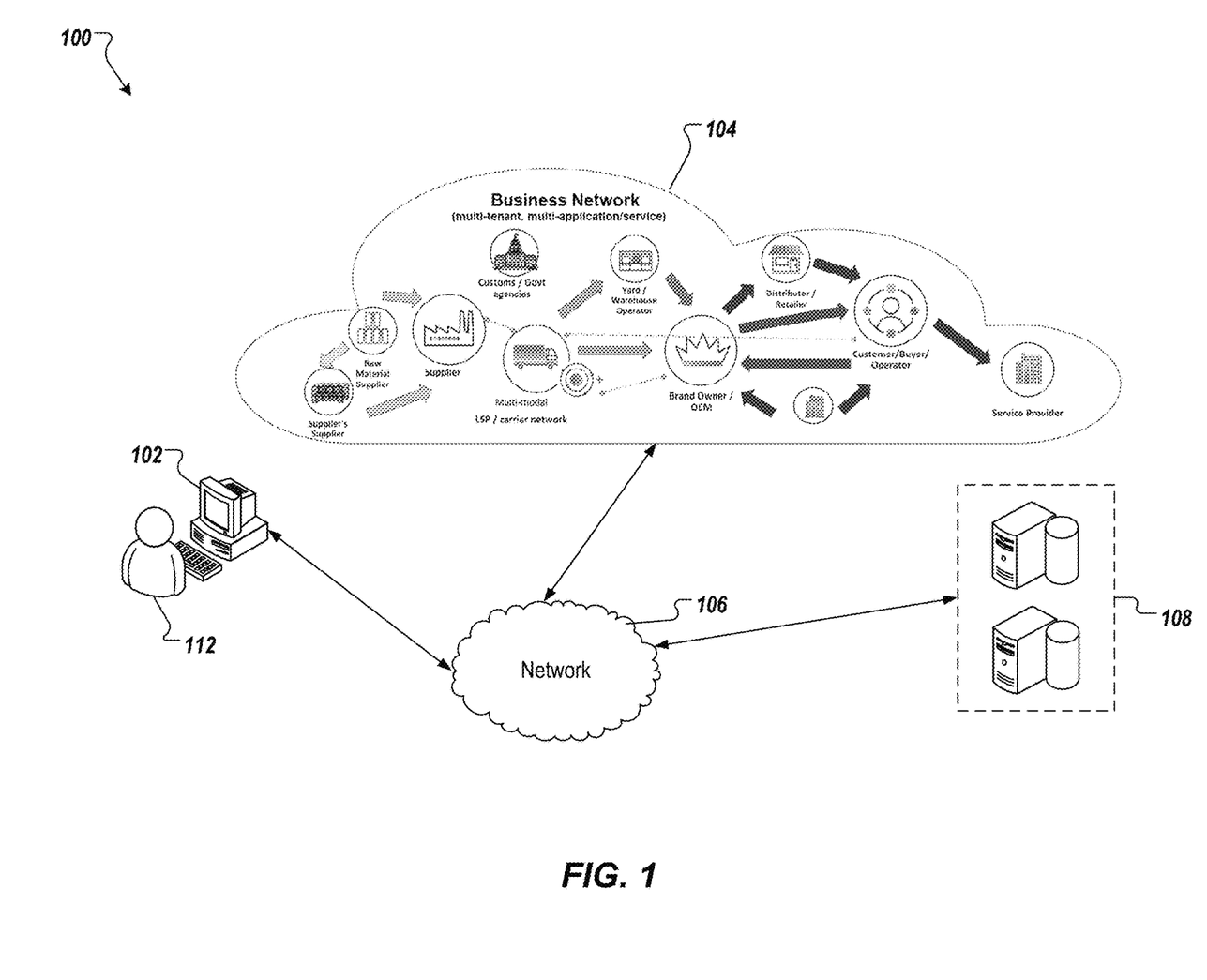
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, a server system 108, and a host platform 104. The server system 108 includes one or more server devices and databases (e.g., processors, memory). In the depicted example, a user 112 interacts with the client device 102.

The host platform network 104 can include one or more platforms, for example, cloud platforms, that run network applications to execute connected processes between parties of the host platform network 104. For example, the network applications that run on the host platform network 104 can be cloud applications that provide services to parties in a supply chain network. The processes that are executed by the network applications can consume data from each other, such that they require data sharing between different parties to smoothly execute processes.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN), or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 108 can host an application (e.g., provided as one or more computer-executable programs executed by one or more computing devices) that provides services in relation to products to end users. The application can be a cloud application that communicates with one or more applications to provide services to end users. In some instances, applications running on the server system 108 may communicate with applications on the host platform network 104 (e.g., a business technology platform network).

In some implementations, the client device 102 can invoke services from applications running at either the host platform network 104 or the server system 108. The host platform 104 can run applications for different customers (or tenant accounts) which can be invoked by users from different devices, including the client device 102. In some implementations, the host platform network 104 can provide data federation logic that can aggregate data for different customers running applications on the host platform and can share data between the different tenants to facilitate process execution at one customer that relies on data generated by another customer.

Figure 2:
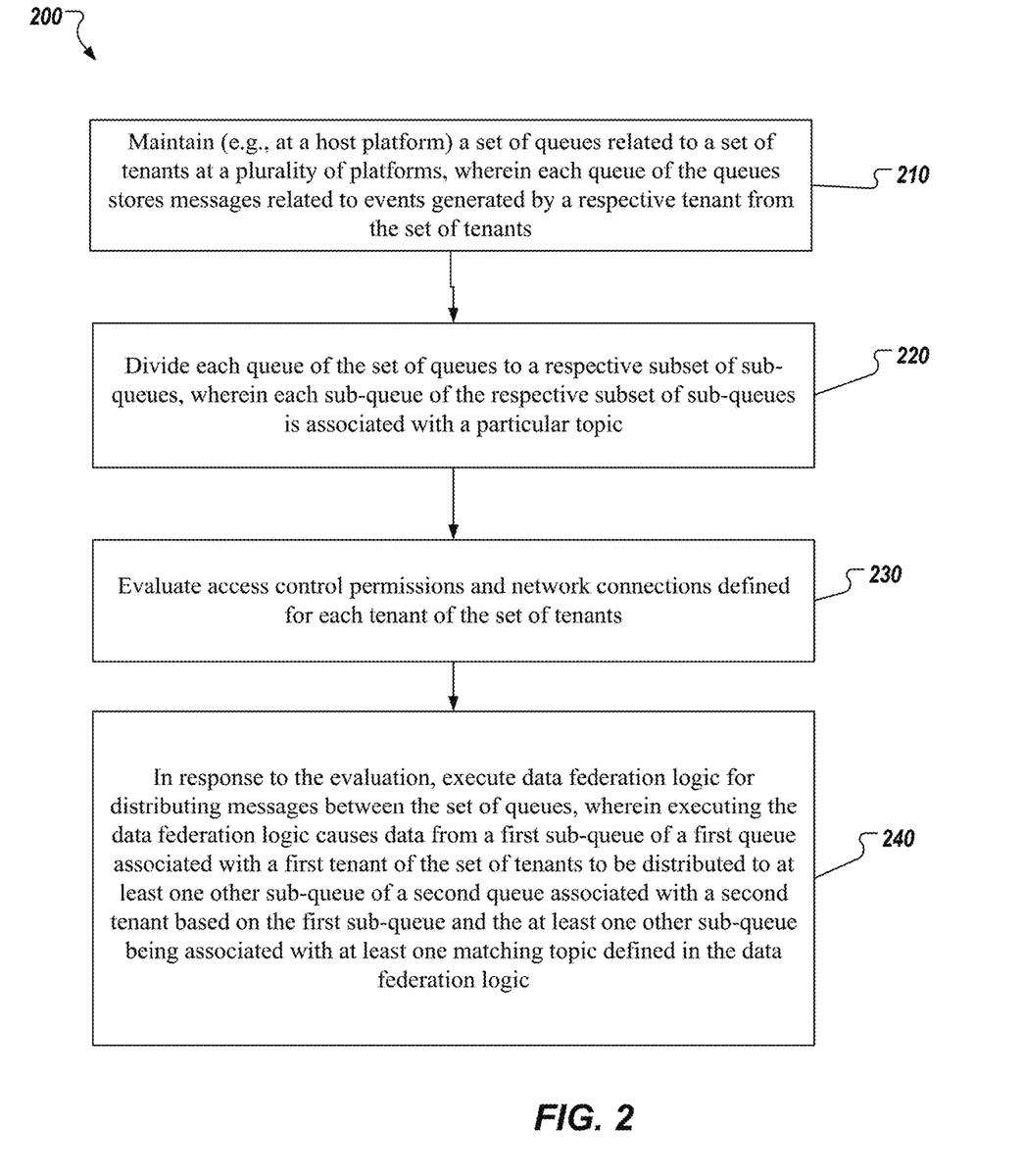
FIG. 2 depicts an example process for data sharing between tenants associated with applications running at one or more platforms that can be executed in accordance with implementations of the present disclosure.

FIG. 2 depicts an example process 200 for data sharing between tenants associated with applications running at one or more platforms that can be executed in accordance with implementations of the present disclosure. In some implementations, the example process 200 can be executed at a host platform similar to the host platform 104 of FIG. 1. The host platform may provide cloud services related to different parties of a business network. The parties of the business network can have tenants or accounts that they can use to subscribe to services provided by the host platform or another platforms. In some implementations, the parties can interact and have defined processes that run at their respective application. Some of the processes that are run for different parties may consume data from other process of other parties. The data that can be exchanged by the parties can be stored at one or more databases related to the host platform.

In some implementations, applications (e.g., network applications, cloud applications, web applications, etc.) running on a plurality of platforms, including the host platform, may not have a directly configured communication channel to exchange data. In some instances, if one application is an application of a manufacturer and the other application is for a buyer, those applications may not be configured to directly share information between each other, or a process at one application may require multiple inputs that may not be available synchronously. For example, two applications and/or hosted processes at software instances running on the plurality of platforms may not have a direct established way to exchange data for a newly manufactured product that the buyer may be interested in purchasing. To support sharing of data between applications and/or executed processes at applications or other software entities running on the plurality of platforms (e.g., the applications and/or processes being related to different parties (e.g., associated with different tenants) of a business network (e.g., supply chain network)), the process 200 can use data federation logic for sharing data for events associated with the parties (e.g., tenants) in a coordinated manner. In some instances, a party can be configured to have access to events generated by another party, wherein data sharing between those parties may be permitted through the provided custom data federation logic by the host platform, as discussed in further detail in FIGS. 3A and 3B.

At 210, a set of queues related to a set of tenants at the plurality of platforms can be maintained. The queues can be maintained at the host platform. Each queue in the set of queues can store a set of messages related to events generated by a particular tenant from the set of tenants. The events generated by tenants can be events associated with executed actions by the tenants at respective applications running on the one or more platforms.

For example, a message in the queue can be related to a first tenant that is related to a first application running on the host platform as a software-as-a-service application. The example message can be stored for the event of including a new invoice for an executed transaction at the first application (and/or a related database) for the first tenant. There can be separate queues mapped to separate tenants associated with the host platform.

In some implementations, events generated by the first tenant are associated with executed data operations at a first cloud application for data objects stored at a database of the first cloud application (e.g., at the host platform or at another platform related to the host platform).

In some implementations, an event collection application can be instantiated (e.g., at the host platform) to consume data related to events executed at a set of applications related to the set of tenants of the plurality of platforms. Each application can run at a respective platform from the plurality of platforms and can be associated with a tenant from the set of tenants.

At 220, each queue of the set of queues is divided into a respective subset of sub-queues, wherein each sub-queue of the respective subset of sub-queues is associated with a particular topic. Based on the division, one queue with messages associated with a first tenant is split into multiple sub-queues, where each sub-queue is associated with a corresponding topic. In some implementations, the division of queues of tenants into sub-queue is performed as described in FIG. 3B. For example, a queue related to a first tenant who is a manufacturer can be divided into different queues related to different types of events associated with respective manufacturing processes. For example, a queue of a manufacturer (e.g., having a tenant defined at the host platform) can have messages divided based on a determination of whether an event is associated with freight orders or procurement orders, among other examples of event types.

In some implementations, one queue of a tenant is split into several queues (e.g., a sub-queue) based on the types of events executed in a related application. The sub-queues can store sets of messages based on the divisions described above.

At 230, access control permissions between tenants, as well as network connections defined for each tenant of the set of tenants at the host platform, can be evaluated. In some implementations, the access control permissions can be stored at the host platform and can define the access rights for exchanging data stored by one tenant with another tenant. For example, the access control permissions may be defined for each tenant, where each tenant can be mapped with access rights and/or permissions levels for accessing and/or manipulating data from other tenants from the set of tenants.

In some implementations, permissions for sharing data between tenants can be determined based on the access control permissions defined for the set of tenants at the plurality of platforms and the network connections defined between pairs of platforms from the plurality of platforms. In some implementations, the access control permissions and the connections can be stored at the host platform to manage the data sharing processes between applications running at the plurality of platforms in a centralized manner. In other instances, some or all of the information may be stored apart or remote from the host platform.

At 240, in response to the evaluation performed at 230, data federation logic for distributing messages between the set of queues is executed. The data federation logic execution can cause data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

In some implementations, executing the data federation logic includes copying messages from the first sub-queue defined for the first tenant to the second sub-queue defined for the second tenant based on determining access permissions for sharing messages between the first queue of the first tenant and the second queue of the second tenant in association with the matching topics of the first sub-queue and the second sub-queue.

In some instances, the data federation logic can be dynamically executed based on data consumption rules defined per tenant and the distribution of messages between sub-queues of different tenants may be performed automatically.

For example, when a first sub-queue of a first tenant includes data that is relevant to a second tenant, and that second tenant has access rights to the first sub-queue related to sales orders, a corresponding message from the first sub-queue associated with a particular sales order relevant for the second tenant can be copied to a respective other sub-queue of the second tenant having a matching topic (e.g., freight orders for first tenant). In some implementations, the data federation logic can include logic to determine which message from the first sub-queue is relevant for which other tenants, and can map that message to that tenant and to a relevant sub-queue of that other tenant. In some instances, a matching topic of queues can be interpreted as the exact same topic defined for both queues, or can be different topics that can be defined as matching in the data federation logic implemented for a particular tenant.

In some implementations, messages at the set of queues are obtained based on subscriptions defined for applications associated with particular tenants. The subscriptions can be defined as consumer applications running on spaces and systems provided for the tenants. The consumer applications can be custom applications, such as the custom application 350 of FIG. 3A, that can define subscription of queues for different data and/or events, and can consume data from different sub-queues in relation to the execution of specific customer (or tenant) processes. For example, a customer process of a given tenant can be fed with data obtained by the custom application from a message at a first sub-queue related to that given tenant, where the message is populated at the first sub-queue from another queue related to a different tenant. In this way, data between different queues can be distributed.

In some implementations, after executing the data federation logic, data can be automatically provided to a customer-specific application (such as the custom application 350 of FIG. 3A) of the first tenant based on changes in the data at sub-queues of the first tenant, wherein the customer-specific application is running at the host platform as a cloud application services providing services for consumption by the first tenant.

Figure 3A:
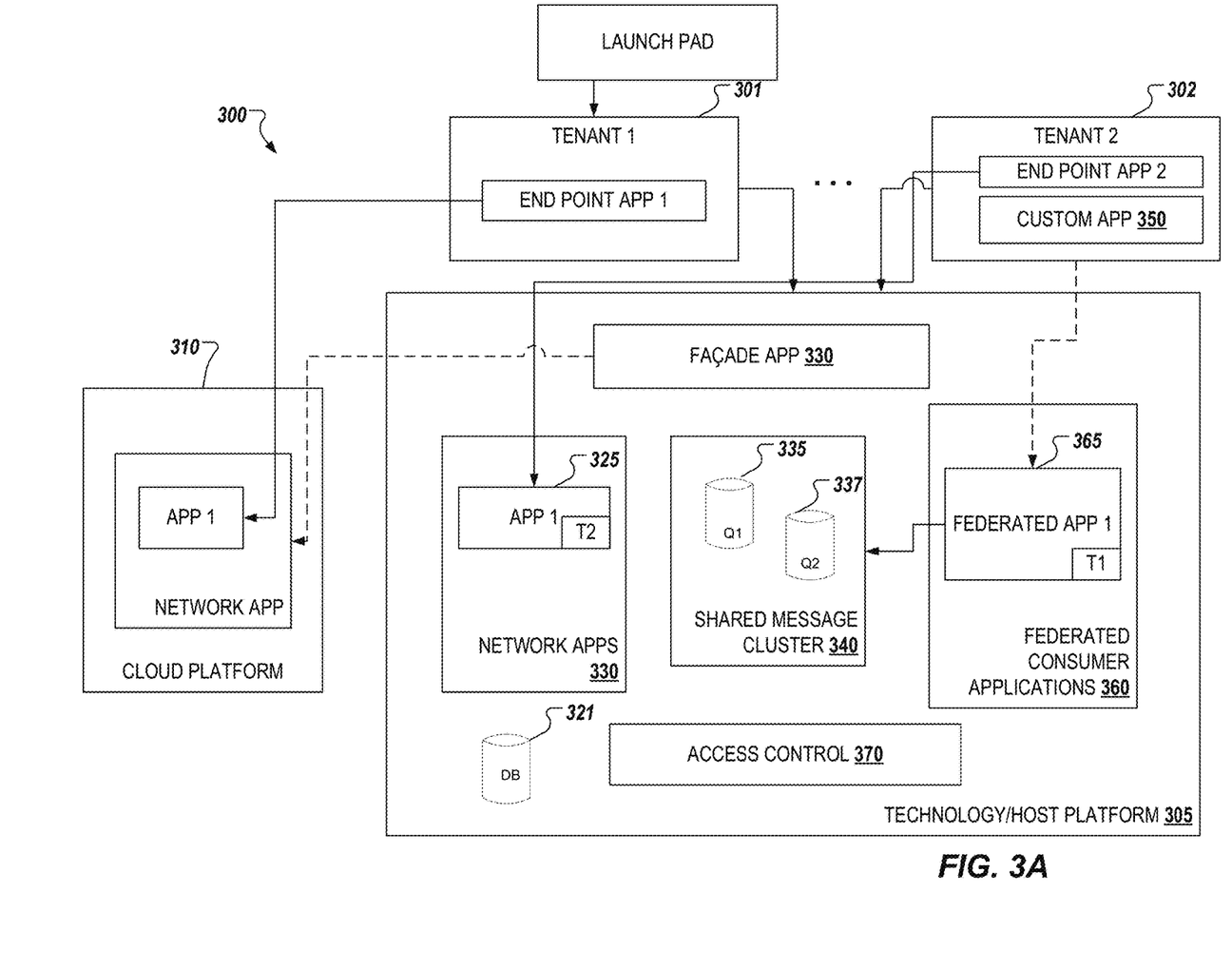
FIG. 3A depicts an example architecture that can be used to execute implementations related to sharing data between tenants associated with network applications running at one or more platforms in accordance with implementations of the present disclosure.

FIG. 3A depicts an example architecture 300 that can be used to execute implementations related to sharing data between tenants associated with network applications running at one or more platforms in accordance with implementations of the present disclosure. The example architecture 300 is an event-based architecture of a host platform 305 configured to receive information (events) for executed events at other related network applications.

Network applications 320 is located at the host platform 305, and is used as a software-as-a-service application by one or more tenants, including "tenant 1" 301 and "tenant 2" 302. Multiple tenants can be defined that use applications running at various platforms, including the host platform 305 and/or other platforms, such as cloud platform 310. The network applications can include an "App 2" 325 that is associated with "tenant 2" 302. The "App 2" can be invoked by the "tenant 2" 302 through an endpoint provided to the tenant, and also through a provided launch pad for the "tenant 2" 302 where the tenant can access multiple applications for which he has a subscription.

The cloud platform 310 can be a platform providing cloud application that can be consumed by the one or more tenants, while data for events executed at the cloud application can be provided to the host platform 305 to facilitate organizational data exchange across multiple platforms.

The host platform 305 has a facade application 330 that is an event collection application that receives information for events performed at network application 320 and/or network applications running on cloud platform 310. It should be appreciated that the facade application 330 can receive events for other cloud platforms and other events for multiple tenants even though not presented on FIG. 3A.

The facade application 330 can be configured to receive events from different applications, each related to different tenants or the same tenants, and can push the event data as messages into the shared message cluster 340. In some instances, one tenant can be associated with multiple applications where messages at the queue of the tenant can be stored in relation to events at each of the multiple applications. If one tenant has multiple applications, and events are performed at each of the applications, an event at one application and an event at another application of that tenant may have the same topic object or a different topic object.

The shared message cluster 340 stores multiple queues (e.g., queues 335 and 337), where each queue is dedicated to a different tenant, and stores the messages in separate sub-queues based on predefined topics.

When the facade application 330 pushes data into one or more sub-queues of the queue dedicated to "tenant 1" 301 in the shared message cluster 340, a federated application 365 dedicated to "tenant 1" 301 can obtain the data from that queue, and, based on data federation logic, can distribute (or copy) the data to another queue of another tenant. Thus, a different queue with a respective sub-queue would be populated with more messages based on the federation logic of the federated application 365 associated with the first tenant. The determination of whether to distribute the message can be performed as described in FIG. 2, although other methods of determining can be used, where appropriate. The federation application 365 can rely on access control permission information for the "tenant 1" 301 based on obtaining and processing access and permission data from access control 370 storage maintained at the host platform.

In some implementations, the host platform 305 can maintain multiple federated customer applications 360 that include the federated application 365 for tenant 1, where the different federated customer applications 360 can have different logic to distribute messages from one sub-queue to another sub-queue of another tenant based on matching topics of the sub-queues.

The federated application 365 can communicatively couple with a customer application 350 of the "tenant 2" to provide data directly to the tenant 2 based on updated data at one or more of the sub-queues of the tenant 2 at the shared message cluster 340.

Figure 3B:
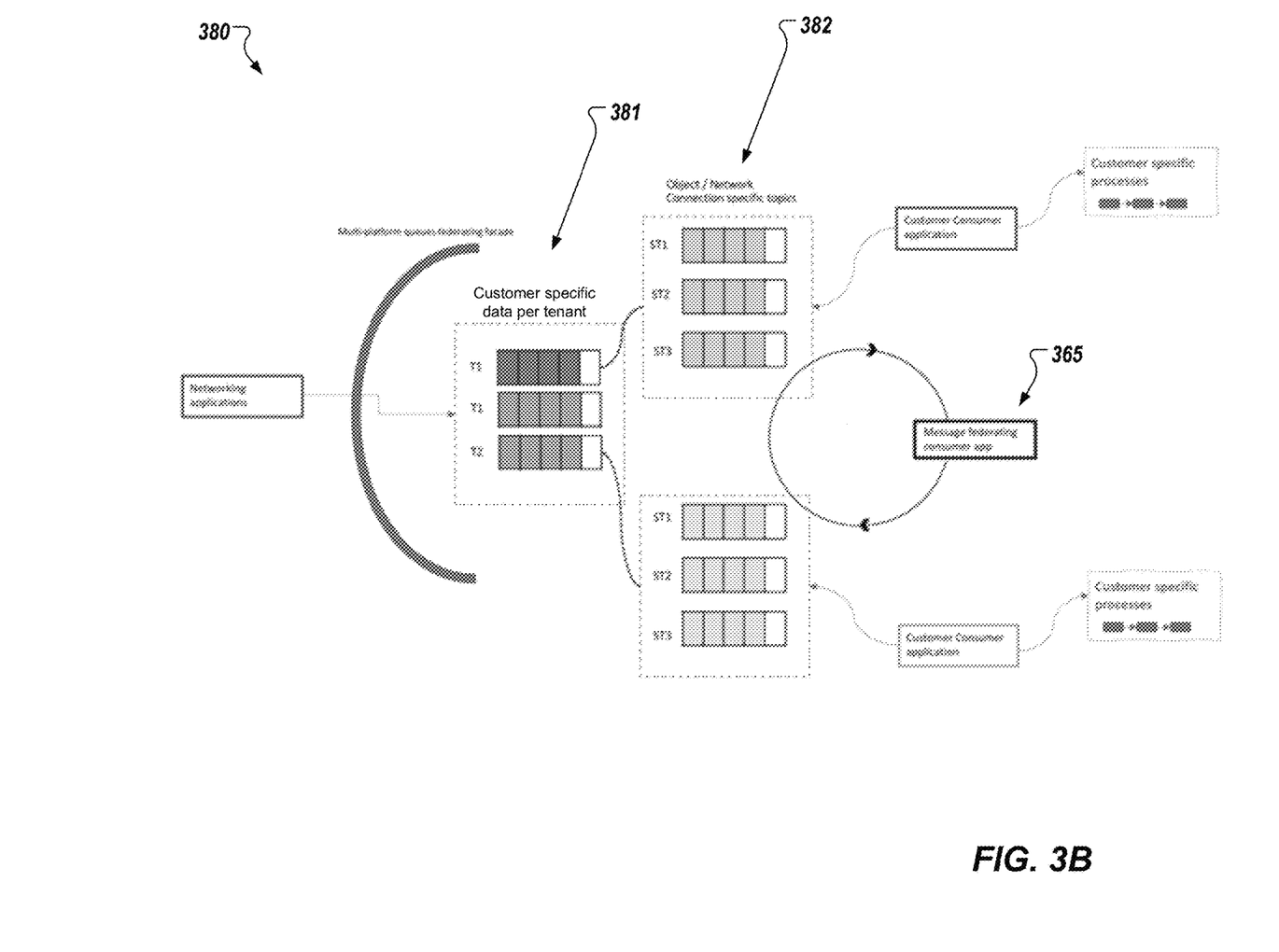
FIG. 3B depicts an example data sharing queue organization and federation in accordance with implementations of the present disclosure.

FIG. 3B depicts an example data sharing queue organization and federation process 380 in accordance with implementations of the present disclosure.

In some implementations, the network application 381 (e.g., a business networking application) could be hosted on multiple platforms, such as the host platform 305 and the cloud platform 310 of FIG. 3. In some cases, the network application 381 can be hosted across multiple zones or network segments within the same platform. An event collection application, such as the facade application 330, can provide a liaison across the solutions and/or applications running on the different platforms and react to changes happening on the network of the platform. The facade application 330 can store messages in a shared cluster of message queues 318 that can substantially correspond to the shared message cluster 340 of FIG. 3A.

In some instances, the network applications are associated with different tenants that correspond to different organizations on the network. Each tenant or organization can be uniquely identified, and may each have a dedicated queue for storing messages related to applications of the respective tenant. The facade application can propagate changes or events performed by one application of a first tenant to a specific sub-queue of the queue dedicated to the tenant. The queue of the first tenant can be organized into multiple sub-queues 382 that are organized based on specific topics, including in one example, sales orders, procurement, logistics, and maintenance, among others. The different sub-queues can be specifically defined in accordance with the topics related to the business or interests of the different tenants.

To better optimize message consumption, each tenant specific topic queue can be divided into multiple object-based topics. A federated application 365, substantially similar to the federated application 365 of FIG. 3A, can consume messages from a first tenant topic and distribute it to a relevant object-based topic(s) based on the access control and network connections of each of the tenants. In this way, messages of a customer tenant can be shared with other customers, and the distribution of messages can be performed according to object-based topic mapping that can facilitate the execution of customer related processes.

In some implementations, the topic queues can be defined to include messages associated with different organizations having different access control rights. A tenant specific topic queue can be divided into multiple sub-queues based on access control considerations related to a set of other organizations with which it exchanged information. In some implementations, there can be a pre-determined configuration for the division of a topic queue. The pre-determined configuration can be based on access right considerations (e.g., different sub-queues corresponding to entities having different access rights, based on the type of data that is to be shared with different access rights with other organizations, among other example considerations), on type of network connections, on other data control rules that can be configured (e.g., based on user input). In some implementations, division of a queue into sub-queues can be based on rules relying on contribution of a respective organization associated with a respective sub-queue for a particular process executed at a software application of an organization associated with the queue. For example, a queue where messages for freight orders are stored can be divided into multiple sub-queues, each sub-queue being associated with a different organization that can be configured with different access rights, such as a supplier, a carrier, and a visibility provider. With such a configuration for dividing a queue into sub-queues, data would be shared with relevant organizations, and unauthorized access to data that is not relevant to a given organization (or party) would be restricted.

In some implementations, queue division into sub-queue can be performed based on considerations for load balancing of the technology platform 305. In some instances, by increasing the number of queues, the overall performance of the shared message cluster 340 may be affected (e.g., decreased performance when the number of queues exceeds a predetermined number). Thus, in some instances, the number of subdivisions of a queue can be determined to balance the load and distributions of data between sub-queues while maintaining a flexible structure to support efficient data sharing between different organizations associated with interconnected processes executed at software applications at the technology platform 305 or at related platforms such as the cloud platform 310.

Figure 4:
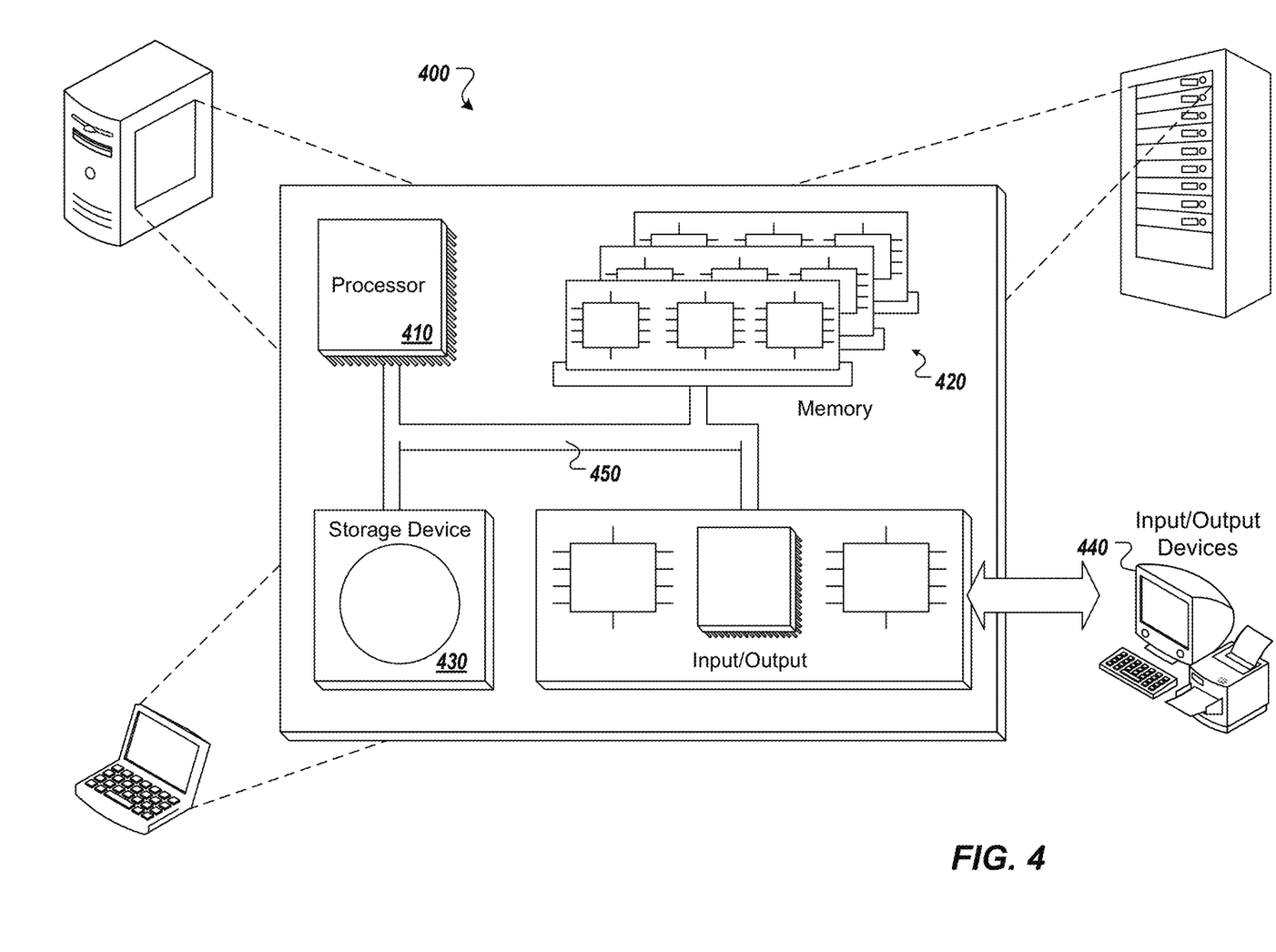
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, and 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory, or random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship with each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of a said example taken in combination and, optionally, in combination with one or more features of one or more further examples are further examples also falling within the disclosure of this application.

Example 1. A computer-implemented method comprising:
maintaining a set of queues related to a set of tenants at a plurality of platforms, wherein each queue in the set of queues stores a set of messages related to events generated by a particular tenant from the set of tenants, wherein the set of queues are divided into a respective subset of sub-queues, wherein each sub-queue of the respective subset of sub-queues is associated with a particular topic;
evaluating access control permissions and network connections defined for each tenant of the set of tenants; and
in response to the evaluation, executing data federation logic for distributing messages between the set of queues, wherein executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

Example 2. The method of Example 1, comprising:
obtaining messages at the set of queues based on subscriptions defined for applications associated with particular tenants, wherein the subscriptions are defined at a consumer application running on a host platform, and wherein the set of queues are maintained on the host platform.

Example 3. The method of Example 2, wherein the method is executed at a host platform, and wherein the applications are hosted on a plurality of platforms including the host platform and an external cloud platform.

Example 4. The method of any one of the previous examples, wherein events generated by the first tenant are associated with executed data operations at a first cloud application for data objects stored at a database of the first cloud application.

Example 5. The method of any one of the previous examples, comprising:
instantiating an event collection application to consume data related to events executed at a set of applications, wherein each application runs at a respective platform from the plurality of platforms and is associated with a tenant from the set of tenants.

Example 6. The method of any one of the previous examples, wherein executing the data federation logic comprises:
determining permissions for sharing data between tenants based on the access control permissions defined for the set of tenants at the plurality of platforms and the network connections defined between pairs of platforms from the plurality of platforms, wherein the execution of the data federation logic includes copying messages from the first sub-queue defined for the first tenant to the second sub-queue defined for the second tenant based on determining access permissions for sharing messages between the first queue of the first tenant and the second queue of the second tenant in association with the matching topics of the first sub-queue and the second sub-queue.

Example 7. The method of any one of the previous examples, wherein the data federation logic is dynamically executed based on data consumption rules defined per tenant.

Example 8. The method of any one of the previous examples, comprising:
after executing the data federation logic, automatically providing data to a customer-specific application of the first tenant based on changes in the data at sub-queues of the first tenant, wherein the customer-specific application is running at the host platform as a cloud application services providing services for consumption by the first tenant.

What is claimed is:
1. A computer-implemented method comprising:
maintaining a set of queues related to a set of tenants at a plurality of platforms, wherein each queue in the set of queues stores a set of messages related to events generated by a particular tenant from the set of tenants, wherein the set of queues are divided into a respective subset of sub-queues, wherein each sub-queue of the respective subset of sub-queues is associated with a particular topic;
evaluating access control permissions and network connections defined for each tenant of the set of tenants; and
in response to the evaluation, executing data federation logic for distributing messages between the set of queues, wherein executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

2. The method of claim 1, comprising:
obtaining messages at the set of queues based on subscriptions defined for applications associated with particular tenants, wherein the subscriptions are defined at a consumer application running on a host platform, and wherein the set of queues are maintained on the host platform.

3. The method of claim 2, wherein the method is executed at a host platform, and wherein the applications are hosted on a plurality of platforms including the host platform and an external cloud platform.

4. The method of claim 1, wherein events generated by the first tenant are associated with executed data operations at a first cloud application for data objects stored at a database of the first cloud application.

5. The method of claim 1, comprising:
instantiating an event collection application to consume data related to events executed at a set of applications, wherein each application runs at a respective platform from the plurality of platforms and is associated with a tenant from the set of tenants.

6. The method of claim 1, wherein executing the data federation logic comprises:
determining permissions for sharing data between tenants based on the access control permissions defined for the set of tenants at the plurality of platforms and the network connections defined between pairs of platforms from the plurality of platforms, wherein the execution of the data federation logic includes copying messages from the first sub-queue defined for the first tenant to the second sub-queue defined for the second tenant based on determining access permissions for sharing messages between the first queue of the first tenant and the second queue of the second tenant in association with the matching topics of the first sub-queue and the second sub-queue.

7. The method of claim 1, wherein the data federation logic is dynamically executed based on data consumption rules defined per tenant.

8. The method of claim 1, comprising:
after executing the data federation logic, automatically providing data to a customer-specific application of the first tenant based on changes in the data at sub-queues of the first tenant, wherein the customer-specific application is running at the host platform as a cloud application services providing services for consumption by the first tenant.

9. A non-transitory computer-readable storage medium coupled to one or more processors and having instructions stored thereon which, when executed by the one or more processors, cause the one or more processors to perform operations comprising:
maintaining a set of queues related to a set of tenants at a plurality of platforms, wherein each queue in the set of queues stores a set of messages related to events generated by a particular tenant from the set of tenants, wherein the set of queues are divided into a respective subset of sub-queues, wherein each sub-queue of the respective subset of sub-queues is associated with a particular topic;
evaluating access control permissions and network connections defined for each tenant of the set of tenants; and
in response to the evaluation, executing data federation logic for distributing messages between the set of queues, wherein executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

10. The non-transitory computer-readable storage medium of claim 9 having instructions which when executed by the one or more processors perform operations comprising:
obtaining messages at the set of queues based on subscriptions defined for applications associated with particular tenants, wherein the subscriptions are defined at a consumer application running on a host platform, and wherein the set of queues are maintained on the host platform.

11. The non-transitory computer-readable storage medium of claim 9, wherein the method is executed at a host platform, and wherein the applications are hosted on a plurality of platforms including the host platform and an external cloud platform.

12. The non-transitory computer-readable storage medium of claim 9, wherein events generated by the first tenant are associated with executed data operations at a first cloud application for data objects stored at a database of the first cloud application.

13. The non-transitory computer-readable storage medium of claim 9 having instructions which when executed by the one or more processors perform operations comprising:
instantiating an event collection application to consume data related to events executed at a set of applications, wherein each application runs at a respective platform from the plurality of platforms and is associated with a tenant from the set of tenants.

14. The non-transitory computer-readable storage medium of claim 9, wherein the operation of the executing of the data federation logic comprises:
determining permissions for sharing data between tenants based on the access control permissions defined for the set of tenants at the plurality of platforms and the network connections defined between pairs of platforms from the plurality of platform, wherein the execution of the data federation logic includes copying messages from the first sub-queue defined for the first tenant to the second sub-queue defined for the second tenant based on determining access permissions for sharing messages between the first queue of the first tenant and the second queue of the second tenant in association with the matching topics of the first sub-queue and the second sub-queue.

15. The non-transitory computer-readable storage medium of claim 9 having instructions which when executed by the one or more processors perform operations comprising:
after executing the data federation logic, automatically providing data to a customer-specific application of the first tenant based on changes in the data at sub-queues of the first tenant, wherein the customer-specific application is running at the host platform as a cloud application services providing services for consumption by the first tenant.

16. A system, comprising:
a computing device; and
a computer-readable storage device coupled to the computing device and having instructions stored thereon which, when executed by the computing device, cause the computing device to perform operations comprising:
maintaining a set of queues related to a set of tenants at a plurality of platforms, wherein each queue in the set of queues stores a set of messages related to events generated by a particular tenant from the set of tenants, wherein the set of queues are divided into a respective subset of sub-queues, wherein each sub-queue of the respective subset of sub-queues is associated with a particular topic;

evaluating access control permissions and network connections defined for each tenant of the set of tenants; and in response to the evaluation, executing data federation logic for distributing messages between the set of queues, wherein executing the data federation logic causes data from a first sub-queue of a first queue associated with a first tenant of the set of tenants to be distributed to at least one other sub-queue of a second queue associated with a second tenant based on the first sub-queue and the at least one other sub-queue being associated with at least one matching topic defined in the data federation logic.

17. The system of claim 16, wherein the computer-readable storage device comprises instructions which when executed, cause the computing device to perform operations comprising:

obtaining messages at the set of queues based on subscriptions defined for applications associated with particular tenants, wherein the subscriptions are defined at a consumer application running on a host platform, and wherein the set of queues are maintained on the host platform.

18. The system of claim 16, wherein the method is executed at a host platform, and wherein the applications are hosted on a plurality of platforms including the host platform and an external cloud platform.

19. The system of claim 16, wherein events generated by the first tenant are associated with executed data operations at a first cloud application for data objects stored at a database of the first cloud application.

20. The system of claim 16, wherein the computer-readable storage device comprises instructions which when executed, cause the computing device to perform operations comprising:

instantiating an event collection application to consume data related to events executed at a set of applications, wherein each application runs at a respective platform from the plurality of platforms and is associated with a tenant from the set of tenants.

* * * * *